June 29, 1937. E. P. BULLARD, 3D 2,085,692
TOOL SLIDE AND DWELL MECHANISM
Filed Jan. 18, 1936 4 Sheets-Sheet 1

FIG. I

INVENTOR.
EDWARD P. BULLARD, III
BY H.T. Sperry
ATTORNEYS

Patented June 29, 1937

2,085,692

UNITED STATES PATENT OFFICE 2,085,692

TOOL SLIDE AND DWELL MECHANISM

Edward P. Bullard, III, Fairfield, Conn., assignor to The Bullard Company, a corporation of Connecticut.

Application January 18, 1936, Serial No. 59,731

17 Claims. (Cl. 82—21)

The invention relates to machine tool slides and dwell mechanisms therefor, and is adapted particularly to machine tools of the lathe type in which the tool slide acts by reciprocation to apply and remove the cutting tools to a rotating work piece.

One of the objects of the present invention is to provide a novel, simple and improved construction which will lend itself to economic manufacture, to simplicity in operation and which will act with smoothness and precision.

Another object is to provide a new and improved tool slide particularly designed for reciprocation in response to the rotation of a feed screw and which has incorporated therein a positive stop mechanism for limiting the movement of the slide in response to the rotation of the screw.

Another important object is the provision of a tool slide mechanism which will incorporate therein a simple dwell mechanism which will permit the slide to remain stationary, after it has reached a predetermined position during further rotation of the screw.

Another object is to provide a slide mechanism in which the dwell period may be readily adjusted to compensate for the particular requirements of machine operations.

Another object of the invention is to provide a positive stop for the feeding of a tool head and, at the same time, allow the drive means to continue to operate for a period prior to the stopping or reversing of the drive means.

Numerous other objects and features of the present invention will be apparent from a consideration of the following specification taken in conjunction with the accompanying drawings in which.

While the invention is broadly applicable to various types of machine tools, it is particularly designed for use in conjunction with a machine in which the tool feed is by the rotation of a threaded feed screw. The invention is adapted for single or multiple tool head machines, but is particularly applicable to multiple spindle station type machines. The structural embodiment of the invention is here adapted as applicable to a simple tool slide in which the tool movement is rectilinear and parallel to the axis of rotation of the work. It is obvious, however, that the invention may be applicable to compound slides which provide more than one tool holder element. The invention is also adaptable for slides which may move in more than a single direction.

The invention, in general terms, includes a body which is preferably referred to as a saddle, and which is provided with an actuating element which is normally latched to the saddle and which may be actuated by a feed screw which may pass therethrough, and with which the element may have threaded engagement whereby the rotation of the screw will cause axial movement of the actuating element.

The releasable latching mechanism includes a pair of cooperating cams, one carried by the actuating mechanism and another carried by the saddle, the cam surfaces being normally secured against movement, with respect to each other, by a trigger mechanism. An adjustable, positive stop is provided to determine the downward movement of the saddle and, prior to engagement thereof, the trigger mechanism is adapted to be actuated thereby to release the normal engagement of the cams, thereby unlatching the actuating mechanism from the saddle and permitting relative movement thereof with respect to the saddle. By adjustment of the spring element, the length of movement of the cam may be varied, thus to positively limit the amount of lost motion between the slide and the feed screw.

In lathe operations, such lost motion or dwell movement is an advantage in that, since it is usual to operate the spindle in conjunction with the feed drive of the tool, it is advisable for the spindle to make one or more revolutions at the end of the cutting action while the tool is still engaged with the work so that the tool will not be left in the cut of the work. It will be hereinafter seen that the present invention accommodates this requirement in a simple, effective and efficient manner without incorporating in the structure weakness and uncontrolled lost motion which would otherwise render the structure faulty in operation and lend itself to the possibility of chattering of the tool.

Figure 1:
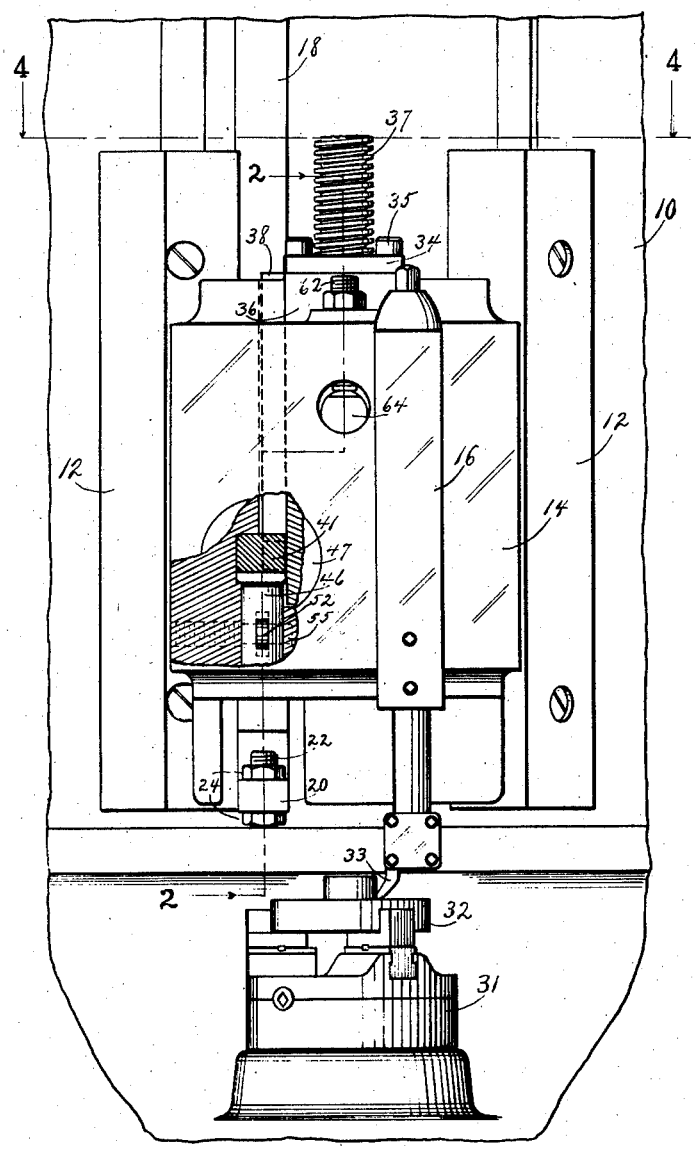
Figure 1 is a front elevation of one form of the present invention shown in conjunction with a work spindle of a lathe type of machine tool, part of the structure being broken away.

Referring more specifically to the drawings, the saddle is mounted upon a suitable support herein shown in the form of a column or base 10, which is provided with ways 12 fitted to accommodate a saddle body 14 upon which may be secured one or more suitable tool holding members, as indicated by the numeral 16 in Figure 1.

The column 10 is further provided with a recessed channel 18 in which an adjustable stop supporting block 20 is mounted, slight adjustment of which is provided for by an adjusting screw 22 and lock nuts 24. The stop supporting block is further provided with notches 26 and threaded apertures 28, which receive a stop piece 30 keyed and bored to be selectively received within a selective notch and to be secured by the medium of a securing screw 29.

As shown in Figure 1, the arrangement is adapted to provide for the reciprocation of the saddle or slide in a path parallel to the axis of a work carrying spindle 31, which rotates a work piece 32. A tool 33 is mounted in the tool holder 16 and is adapted to move in an axial direction to effect a turning of the work piece.

Figure 2:
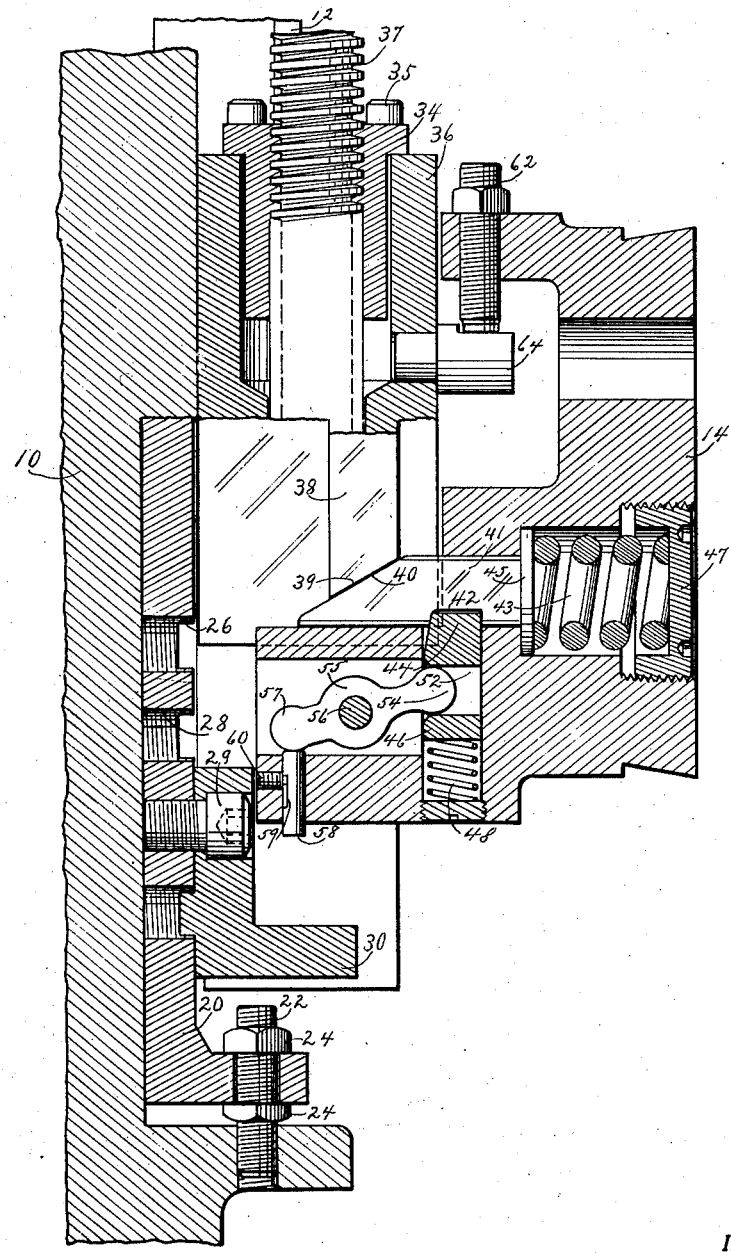
Figure 2 is a transverse section taken on the lines 2—2 of Figure 1.
Figure 3:
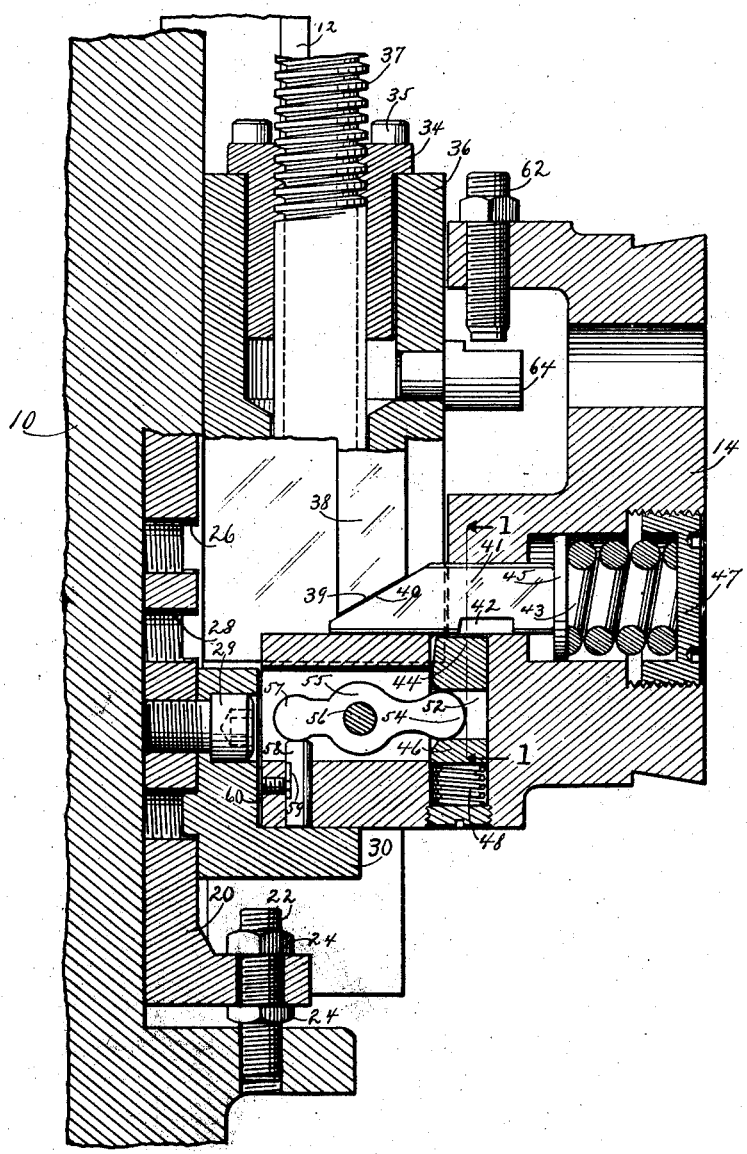
Figure 3 is a similar section showing the parts in a different position.
Figure 4:
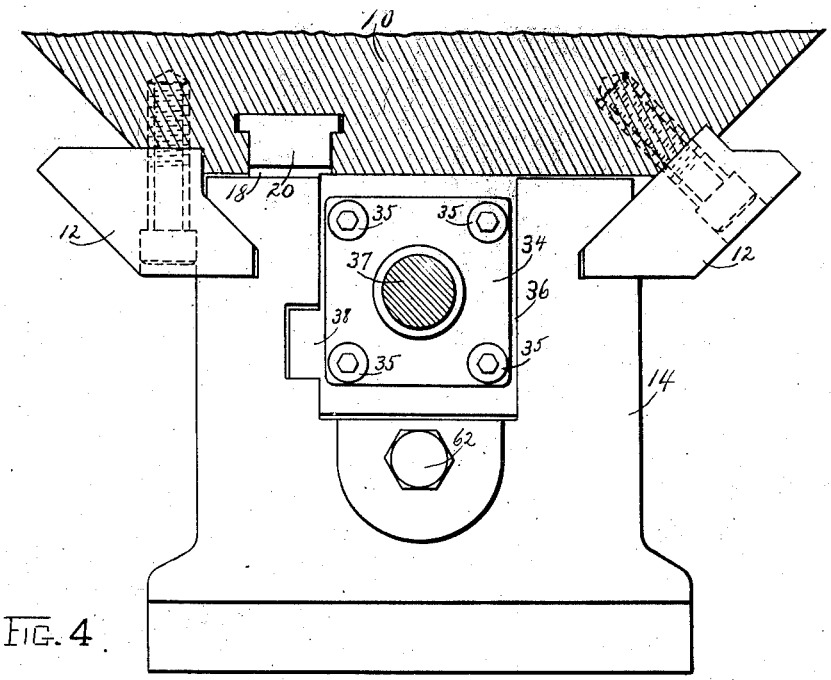
Figure 4 is a top plan view as taken on the lines 4—4 of Figure 1.

The body of the saddle 14 has a central recess within which is mounted an actuating member 36 shown partially in sections in Figures 2 and 3, and within the actuating member is secured an operating nut 34 through the medium of securing screws 35, whereby, upon rotation of a feed screw 37, the nut will act to vertically raise or lower the actuating member in accordance with the direction of rotation of the screw; rotative movement of the nut and actuating member, with respect to the slide, being precluded by the inter-fitting relation thereof. The side of the actuating member 36 is provided with a flange 38 extending into an accommodating recess of the saddle, the lower end of the flange 38 is provided with an inclined camming surface 39, which is maintained in contact with a cooperating, similarly inclined, surface 40 of a spring-urged latching bolt 41, which is preferably of rectangular cross-section, as indicated in Figure 1 of the drawings, and which is slidable through the body of the saddle 14. The bolt 41 is normally urged inwardly by a spring 43 acting upon the bolt head 45, its tension being adjustable by adjustment of a screw cap 47.

The lower side of the bolt 41 is provided with a recess 42, adapted to receive a head 44 of a spring-urged plunger 46 which is normally urged upwardly by a spring 48. The plunger 46 is provided with an opening 52 to receive therein a head 54 of a trip lever 55 which is freely pivoted upon a pin 56. The opposite end 57 of the trip lever is held in engagement with the upper end of a trip pin 58, mounted to extend through and protrude from the lower portion of the saddle, and mounted for limited, free movement therethrough, the limitation being provided by the cooperation of a recess 59 thereof and a set screw 60.

The downward movement of the saddle or the slide, with respect to the actuating element, is adjustably limited by a set screw 62, adjustably extending through a top flange of the slide and adapted to limit the downward movement of the slide by engagement with a stop lug 64, mounted in the actuating member 36, as shown in Figures 2 and 3.

In the operation of the device, the normal position of the parts is shown in Figure 2, in which the actuating element is latched to the saddle or slide, and the cooperation of the set screw 62 and lug 64 act in conjunction with the cooperative action of the angled surfaces to cause either directional rotation of the feed screw to move the saddle with the actuating member in either direction. At the termination of the downward feeding movement, the latch pin engages the foot of the stop piece 30, and, as the slide proceeds to its definite, positive stop by engagement with the foot, the pin is pushed upwardly and the lever rocks on its fulcrum and withdraws the latch pin. This releases the actuating element from the slide so that further downward movement thereof, in response to further rotation of the screw, will cause a camming action to push outwardly the bolt 41, compressing its spring 43 until the coils thereof come into contact to act as a definite limit for the downward movement of the element with respect to the slide.

The timing of the feed works for the screw may also be adjusted so as to stop the movement of the screw to determine the amount of lost motion between the element and the slide so that such movement of the screw may stop prior to the limit of compression of the spring. A definite limit is provided by the adjustment of the spring. When the feed screw is reversed, the action starts from the position of the part, as shown in Figure 3. The actuating element moves upwardly with respect to the slide, the plunger moves inwardly and the lug engages the set screw, thus lifting the slide, whereupon, the latch plunger moves downwardly through the bottom of the slide and the plunger 46 engages the bolt 41 to restore the parts to their normal position as shown in Figure 2.

It will be understood that numerous changes, modifications and the full use of equivalents may be utilized in the carrying out of the present invention without departure from the spirit or scope of the appended claims.

Having set forth the nature of my invention, what I claim is:

1. In a tool mechanism for machine tools, a saddle, an operating element therefor, cooperating cam surfaces on said element and said saddle, means for retaining said surfaces against camming action to latch the saddle and element for movement together and means for releasing said surfaces for camming action to permit the element to move with respect to the saddle.

2. In a tool mechanism for machine tools, a saddle, an operating element therefor, cooperating cam surfaces on said element and said saddle, means for retaining said surfaces against camming action to latch the saddle and element for movement together, means for releasing said surfaces for camming action to permit the element to move with respect to the saddle and means for limiting the amount of such relative movement.

3. In a tool mechanism for machine tools, a saddle, an operating element therefor, cooperating cam surfaces on said element and said saddle, means for retaining said surfaces against camming action to latch the saddle and element for movement together, means for releasing said surfaces for camming action to permit the element to move with respect to the saddle and means for adjustably limiting the amount of such relative movement.

4. In a tool mechanism for machine tools, a saddle, an operating element therefor, cooperating cam surfaces on said element and said saddle, means for retaining said surfaces against camming action to latch the saddle and element for movement together, means for releasing said surfaces for camming action to permit the element to move with respect to the saddle and a positive stop for limiting the movement of the saddle operable to release said surfaces to permit said respective movement.

5. In a tool slide, an actuating member, a cam surface carried thereby, a tool slide and a cam surface mounted in said slide, one of said surfaces being releasably retained in contact with the other cam surface whereby the cooperation of said surfaces will effect movement of said slide with said element during the retention of the releasable surface.

6. In a tool slide, an actuating member, a cam surface carried thereby, a tool slide, a cam surface mounted in said slide, one of said surfaces being releasably retained in contact with the other cam surface whereby the cooperation of said surfaces will effect movement of said slide with said element during the retention of the releasable surface and means operable upon predetermined movement of the slide to release said releasable surface to permit relative movement of the operating element with respect to the slide.

7. In a tool slide, an actuating member, a cam surface carried thereby, a tool slide, a cam surface mounted in said slide, one of said surfaces being releasably retained in contact with the other cam surface whereby the cooperation of said surfaces will effect movement of said slide with said element during the retention of the releasable surface, means operable upon predetermined movement of the slide to release said releasable surface to permit relative movement of the operating element with respect to the slide and means for adjustably limiting the amount of said relative movement.

8. In a machine tool, a feed screw, a saddle, a surface over which said saddle moves, a positive stop on said surface to limit the movement of the saddle, an operating element within the saddle for connecting the saddle for rectilinear movement in response to rotation of the screw and means releasably connecting said element and saddle, said means being operable by said stop to release the saddle from the element.

9. In a machine tool, a feed screw, a saddle, a surface over which said saddle moves, a positive stop on said surface to limit the movement of the saddle, an operating element within the saddle for connecting the saddle for rectilinear movement in response to rotation of the screw and means releasably connecting said element and saddle, said means being operable by said stop to release the saddle from the element and including a member adapted to be cammed in response to relative movement between the element and the saddle.

10. In a machine tool, a feed screw, a saddle, a surface over which said saddle moves, a positive stop on said surface to limit the movement of the saddle, an operating element within the saddle for connecting the saddle for rectilinear movement in response to rotation of the screw, means releasably connecting said element and saddle, said means being operable by said stop to release the saddle from the element and including a member adapted to be cammed in response to relative movement between the element and the saddle and means for adjustably limiting the amount of camming movement.

11. In a machine tool, a feed screw, an element adapted to be reciprocated in response to the rotation thereof, a saddle, means for releasably connecting said element and saddle, a positive stop for said saddle, a latch mechanism operable by said stop to release said element from said saddle and adjustable means for limiting the respective movement between said element and said saddle.

12. In a machine tool, a feed screw, an element rectilinearly movable in response to the rotation of the screw, a saddle, a surface on said element co-acting with the surface on said saddle for moving the saddle downwardly upon downward movement of said element and a separate surface carried by said element and engageable with a separate surface of said saddle for lifting said saddle upon upward movement of said element.

13. In a machine tool, a feed screw, an element rectilinearly movable in response to the rotation of the screw, a saddle, a surface on said element co-acting with the surface on said saddle for moving the saddle downwardly upon downward movement of said element and a separate surface, carried by said element and engageable with a separate surface of said saddle, for lifting said saddle upon upward movement of said element, said surfaces being arranged to permit movement of said element with respect to said saddle.

14. In a machine tool, a feed screw, an element rectilinearly movable in response to the rotation of the screw, a saddle, a surface on said element co-acting with the surface on said saddle for moving the saddle downwardly upon downward movement of said element and a separate surface, carried by said element and engageable with a separate surface of said saddle, for lifting said saddle upon upward movement of said element, said surfaces being arranged to permit movement of said element with respect to said saddle, one of said surfaces being adjustable for varying the respective movement between said element and said saddle.

15. In a machine tool, a feed screw, an element rectilinearly movable in response to the rotation of the screw, a saddle, a surface on said element co-acting with the surface on said saddle for moving the saddle downwardly upon downward movement of said element and a separate surface, carried by said element and engageable with a separate surface of said saddle, for lifting said saddle upon upward movement of said element, said surfaces being arranged to permit movement of said element with respect to said saddle and one of said elements being movable to permit movement of said element with respect to said saddle.

16. In a machine tool, a feed screw, an element rectilinearly movable in response to the rotation of the screw, a saddle, a surface on said element co-acting with the surface of said saddle for moving the saddle downwardly upon downward movement of said element and a separate surface, carried by said element and engageable with a separate surface of said saddle, for lifting said saddle upon upward movement of said element, said surfaces being arranged to permit movement of said element with respect to said saddle and one of said elements being movable to permit movement of said element with respect to said saddle and means operable upon predetermined movement of said saddle to release said movable surface.

17. In a machine tool, a feed screw, an element rectilinearly movable in response to the rotation of the screw, a saddle, a surface on said element co-acting with the surface of said saddle for moving the saddle downwardly upon downward movement of said element and a separate surface, carried by said element and engageable with a separate surface of said saddle, for lifting said saddle upon upward movement of said element, said surfaces being arranged to permit movement of said element with respect to said saddle and one of said elements being movable to permit movement of said element with respect to said saddle, means operable upon predetermined movement of said saddle to release said movable surface and means, operable through the cooperation of said surfaces, to move one with respect to the other after the release of one of the surfaces.

EDWARD P. BULLARD, III.